July 5, 1938.  R. R. RIDGWAY  2,123,158

ELECTRIC FURNACE STRUCTURE FOR MAKING ABRASIVE METAL CARBIDES

Filed Nov. 21, 1935  2 Sheets-Sheet 1

Inventor
RAYMOND R. RIDGWAY

July 5, 1938.  R. R. RIDGWAY  2,123,158
ELECTRIC FURNACE STRUCTURE FOR MAKING ABRASIVE METAL CARBIDES
Filed Nov. 21, 1935  2 Sheets-Sheet 2
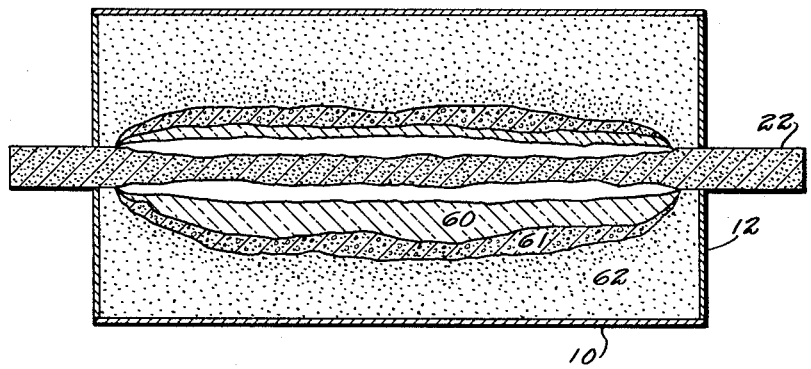
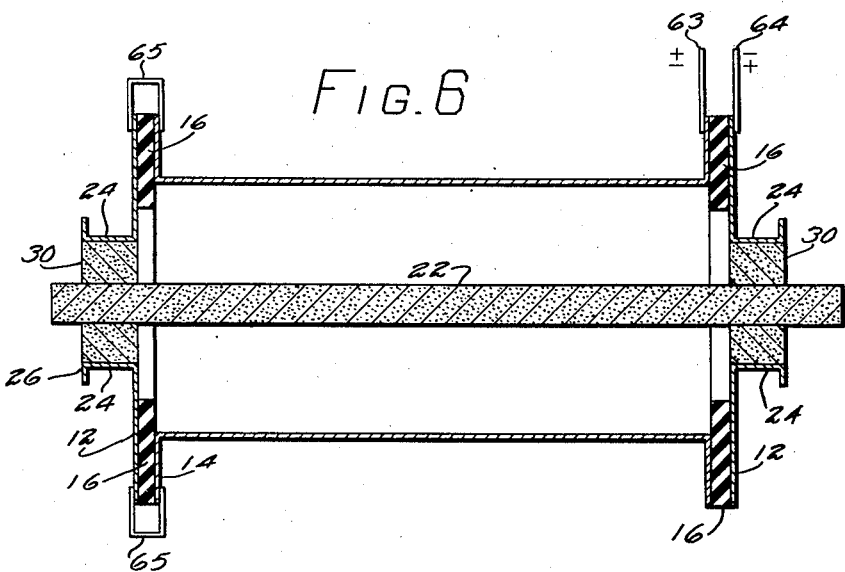
Inventor
RAYMOND R. RIDGWAY Patented July 5, 1938

2,123,158

UNITED STATES PATENT OFFICE 2,123,158

ELECTRIC FURNACE STRUCTURE FOR MAKING ABRASIVE METAL CARBIDES

Raymond R. Ridgway, Niagara Falls, N. Y., assignor to Norton Company, Worcester, Mass., a corporation of Massachusetts Application November 21, 1935, Serial No. 50,932

4 Claims. (Cl. 13—20)

This invention relates to an electric furnace structure and more particularly to a furnace especially adapted for the manufacture of boron carbide, silicon carbide, titanium carbide and tungsten carbide herein classed as abrasive metal carbides.

Silicon carbide has been made heretofore in a substantially open electric resistance furnace as is shown in the U. S. patents to Acheson No. 560,291 and Hutchins 1,331,435. In such furnaces, a mixture comprising silica and carbon is placed in a brick structure around a graphite resistor and an electric current is passed through the core to heat the charge to a synthesizing temperature. For each ton of silicon carbide produced there are two tons of carbon monoxide gas evolved. It has therefore been considered necessary that the bricks of the furnace walls form an open structure through which the evolved gas may readily escape and be burned by the oxygen of the atmosphere. When a similar type of furnace was employed for electrically synthesizing boron carbide from a mixture of boric oxide and carbon, it was found that the volatile boron metal escaped from the furnace in an evolution of copious fumes of boron oxide. Also, after the ingot of boron carbide had been made during the heating stage and the furnace finally opened, the final product was found to have been oxidized to a serious extent by an influx of air through the open brick work during the cooling stage. Similarly, any attempt at making boron carbide in an open arc furnace would involve difficulties such as losses of boron as a volatile vapor and its oxidation to boron oxide. It is desirable to hold the volatile boron within the charge during the furnace run and particularly to exclude air from contact with the boron carbide during both the heating and the cooling stages. The same principles apply in the manufacture of the other abrasive metal carbides which oxidize readily when heated.

A primary object of this invention is, therefore, to provide a furnace for making boron carbide and the other abrasive metal carbides wherein oxidation of the product and losses by volatilization are minimized.

In accordance with this invention, I make the abrasive metal carbide by electrical synthesis of a suitable charge within an electric resistance furnace having a resistor located centrally of the charge which in turn is entirely enclosed by impervious furnace walls arranged to prevent access of air to the charge and loss of volatile values while permitting the escape of the evolved gases.

Further objects of the invention are to provide a furnace structure which insures the formation of an abrasive metal carbide economically and efficiently; and in particular to provide a structure which permits the use of a metal casing and yet insures a properly insulated path for the electric current; to provide for cooling the outer metal casing and the ends of the resistor by artificial means and controlling the temperature of the reaction charge; to provide for the relative differences of expansion between the electrical resistor and the casing and other furnace parts; and to provide adequately for the escape of evolved gases without serious loss of volatile values or the cooling stage.

The preferred furnace structure comprises a metal casing surrounding a resistor carrying a high amperage low voltage alternating current. If the surrounding shell constituted a closed circuit insulated from the resistor and outside of the resistor circuit and so arranged as to cut the lines of force set up by the resistor, the arrangement would constitute a one turn transformer having a high impedance and resulting in a low power factor in the primary circuit, thus rendering the furnace inefficient in its operation.

A further object of the invention is, therefore, to provide a furnace structure in which the electrical circuit is such as to insure a very low inductance and a high power factor. Other objects will be readily apparent in view of the following disclosure.

Referring to the drawings illustrating this invention:

Fig. 5 is a diagrammatic sketch showing a typical boron carbide ingot at the end of a furnace run; and Fig. 6 is a vertical sectional view, with parts omitted, showing a modification wherein the furnace is of low inductance.

Figure 1:
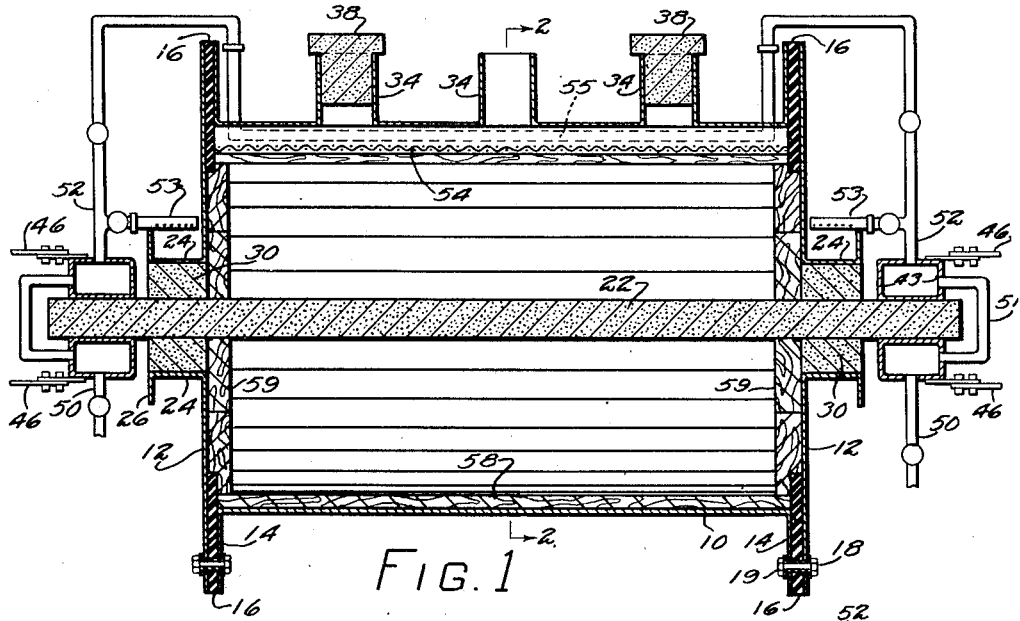
Fig. 1 is a vertical section through one form of furnace embodying my invention.

In accordance with this invention, I propose to make an abrasive metal carbide by providing a furnace charge of granular carbon and the oxide of the required metal mixed in suitable proportions for the electrical synthesis of the carbide and then heating this charge to the required temperature by passing a current through an electrical resistor located substantially centrally therein and progressively forming a gradually enlarging ingot of the metal carbide, while maintaining a nonoxidizing atmosphere around the charge, after which the ingot is cooled within the furnace while air and other detrimental gases are excluded and oxidation of the product is avoided.

The preferred structure employed for carrying out this process, and which embodies the various features herein claimed, comprises a water cooled metal casing carrying a resistor centrally supported within the charge and having outwardly projecting water cooled electric terminals for connection with a power circuit, the casing and resistor being so constructed and arranged as to provide for escape of the generated gas but prevent access of the atmosphere to the charge. All of these features, some of which are capable of use without the others, are illustrated in the structures shown in the drawings.

Figure 2:
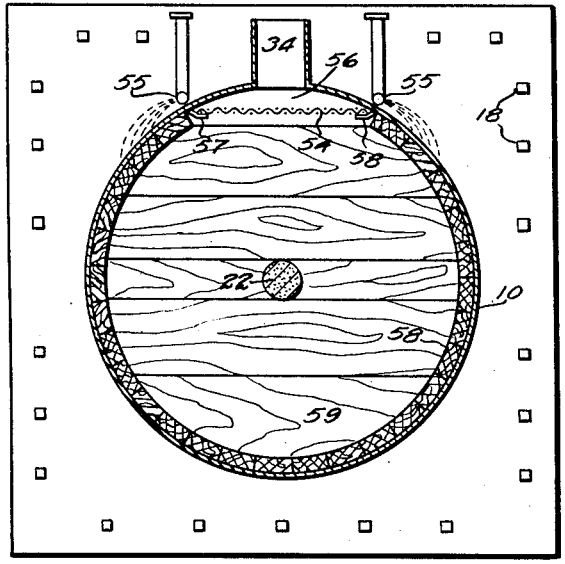
Fig. 2 is a vertical section on the line 2—2 of Fig. 1.

In the embodiment shown in Figs. 1 and 2, the furnace comprises a metal casing having a cylindrical or peripheral wall 10 of iron, aluminum or other suitable metal and the two end walls 12 of similar material, which are shaped and arranged to form a cylindrical reaction chamber within which an electrical resistor is mounted substantially centrally or axially of the peripheral wall. This wall 10 may of course be made of a plurality of flat sides arranged as the sides of a parallelepipedon or in other desired form. For the purpose of fastening the peripheral wall to the end walls, the former is provided with outstanding annular flanges 14 at its two ends, thus forming a spool shaped structure. The end walls 12 are each annular in shape and coextensive with the flanges, so that they may be readily fastened together.

Figure 4:
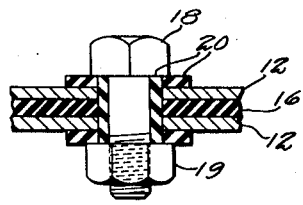
Fig. 4 is an enlarged sectional detail of one of the devices employed for bolting the walls together.

In order that the end walls 12 may be electrically insulated from the peripheral portion 10 of the casing, a gas tight insulation 16 of asbestos or other suitable material is placed between the flanges and the end walls. This insulation is made annular in shape and located only adjacent to the flanges 14, since it is not needed at the central portion of the furnace and particularly because it is fusible at the high temperature of the resistor. To facilitate assembly and loading of the furnace charge, the end walls are made readily removable. They are fastened to the flanges, as indicated in Fig. 4, by the bolts 18 passing through aligned openings in the metal parts and the asbestos ring therebetween and secured in place by the nuts 19. The various parts of the clamping bolts and nuts are also insulated from the metal parts by means of the insulating washers and sleeves 20 which may be made of any suitable material, such as asbestos.

The resistor 22 is mounted axially of the peripheral wall 10 and arranged to extend through the charge and project outwardly from each end of the casing. In order to support the resistor, each of the annular end walls 12 is provided with a cylindrical extension or hub 24 which has an outwardly extending flange 26. These parts form an annular trough within which cooling water may flow. Mounted within these cylindrical hubs 24 are graphite sleeves 30 which have been shaped to fit snugly therein and prevent the passage of gases as well as to conduct heat to the water cooled trough wall 24. The graphite sleeves 30 in turn support the resistor rod 22 which is adapted to carry the electrical current for heating the charge of material within the casing. This resistor is preferably made of graphite, although it may be made of other suitable electrically conductive material depending upon the nature of the charge being treated. This graphite rod 22 is also shaped for accurate sliding fit within the sleeves 30 so as to provide a gas tight joint and a heat conducting path. Thus the sleeve 30 serves as an enlargement on the end of the high temperature rod 22 which may be water cooled sufficiently at its outer surface so that it may be supported on the metal wall of the hub 24 and in turn cool the exposed end of the resistor rod. Being made of the same materials, the rod and the sleeve have the same coefficients of expansion and the joint therebetween cannot open to permit passage of gas to or from the furnace chamber.

Egress of the gases generated during the operation of the furnace is permitted through the pipes 34, which have open upper ends and are welded to the casing 10 around suitably shaped holes therein. Plugs 38 of graphite or other suitable material are arranged to close the passages during the cooling stage. When the furnace is running, two of the plugs may be left loosely in place to prevent any circulation of air into the casing as the generated carbon monoxide gas escapes through the third opening. These plugs are left somewhat loose however so that they may be blown out by the gas pressure and provide an emergency exit for the gas, in case the third passage becomes plugged through a building up of deposited material adjacent to the opening thereof. During the cooling step, all of the plugs may be fitted in place, or one may be allowed to remain open while kerosene is injected to provide a neutral to reducing atmosphere.

Figure 3:
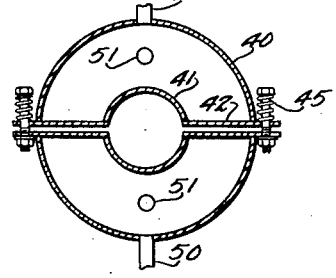
Fig. 3 is a sectional detail of the water cooled electrode clamping device.

In the embodiment shown in Fig. 1, electrical connections are made at the two ends of the graphite resistor 22 by means of clamps which are shown in detail in Fig. 3 of the drawings. Each of these clamps comprises two hollow casings through which water may be passed to keep them cool. Each of these casings is made of two semicylindrical concentric walls 40 and 41 connected by the diametrically positioned walls 42 and the end walls 43 to form a closed chamber. The central wall 41 of each of these clamps is shaped to fit against the outer surface of the resistor rod 22 and be clamped tightly thereagainst. The clamping devices 45 comprise bolts, nuts and springs as clearly shown.

The electrode terminals are suitably fastened to these clamping members as by welding metal strips 46 thereon, so that the electric current may be readily transmitted from an outside source of power to the resistor rod. It will be understood that various electrical apparatus well known to those skilled in the art is to be employed in connection with this furnace structure for transmitting the required electrical power to the furnace and regulating the same. It will also be understood that the dimensions of the furnace chamber and the length and cross sectional area of the resistor rod will be so proportioned as to obtain the desired electrical results. It is desirable in this type of furnace that the graphite resistor be sufficiently large relative to the size of the ingot to be made that it will not be wholly consumed or broken until the reaction has gone on for a sufficient time. It may be observed that in making boron carbide the rod is protected to a large extent by the boron carbide formed around it so that the boron oxide cannot contact and react therewith.

The exposed ends of the resistor rod and the end walls 12 are kept cool by circulating water through the hollow clamps and in the trough 24 surrounding the sleeve 30. This may be readily accomplished by means of the valved water pipes 50 which communicate from a suitable source of water supply to the lower members of the clamps. A pipe 51 connects the upper clamp with the lower member, and from each of the upper clamps a further pipe 52 carries water to the branch arm 53 where the water escapes through perforations into the upper portion of the trough 24. Likewise an extension of the pipe 52 communicates with the pipes 55 which extend longitudinally of the cylindrical wall 10 and near the top thereof. These pipes 55 are perforated so that water may issue therefrom and flow downwardly over the outer casing wall 10 for the purpose of keeping the wall cooled to a required temperature. Suitable valves may be provided for regulating the flow of water to these various parts. By using the sleeve 30, it is possible to cool the resistor rod 22 closely adjacent to the hot zone and thus further protect the end walls and the insulation within the chamber.

Located within the upper portion of the casing is a perforated wall 54 made of a coarse meshed screen of iron or other suitable metal which is arranged beneath the pipes 34 and spaced from the top of the casing wall 10 to provide a space 56 for the accumulation of gases generated within the charge and to prevent the charge from contacting with and closing the openings of the pipes 34. These screens may be welded in place if desired, or slidably secured by means of the metal strips 57 welded to and projecting downwardly from the wall 10. This space 56 thus provides a passage for the accumulation and escape of the large volume of carbon monoxide gas which is liberated during the furnace run. The exit pipe 34 may be connected to further piping to conduct the gas away from the furnace for such use as may be desired and particularly to prevent its escape into the room. Or, the gas may be allowed to burn quietly at the end of the exit tube 34. It will be appreciated that because of the generation of the large volume of gas during the furnace run, no air can enter the exit passage 34. This construction furthermore makes it feasible to provide an increased gas pressure within the reaction chamber which can be accomplished by controlling the egress of the outflowing gas.

It is also to be appreciated that by means of this closed furnace structure, any serious loss due to volatilization of boron metal during the decomposition of boron oxide will be largely prevented. This is due to the fact that oxygen cannot get access to this volatilized gas and burn it and because the casing is of such dimensions and the outer layer of the charge is sufficiently cool to condense the boron metal vapor and hold it entrapped therein. Because of the large space 56 provided in the upper portion of the reaction chamber, there is also little danger of the boron metal vapor escaping through a small blow hole in the charge, as might be the case if the walls were made of open brick work as heretofore devised. No vapor can escape from the furnace except through the passages to the exit openings provided and the temperature of the chamber 56 is sufficiently low so that the vapors are condensed therein and are retained in the charge.

The temperatures required for making the abrasive metal carbides are very high, and there is no commercially available refractory material which can be employed as a furnace wall which is intended to contact directly with the charge at its synthesizing temperature. This is particularly the case where boron oxide is present, since the hot material would serve as a flux for the ordinary ceramic refractories. Hence, it is essential that the granular furnace charge itself serve as the container within which the ingot of metal carbide may be formed. Consequently, the furnace chamber is made sufficiently large so as to provide room for an outer zone of the cooled charge which in turn supports the inner hot zone within which the ingot is made. That is, the diameter of the furnace chamber is large as compared with its length and with the diameter of the ingot or the hot reaction zone, as indicated in Fig. 5 of the drawings, wherein the ingot 60 of boron carbide is shown around the resistor 22 and surrounded by the fire sand 61 or partially converted material, which in turn is surrounded by the unconverted charge 62 enriched by volatilized products condensed therein. When the furnace is made sufficiently large, then an ordinary iron wall which is water cooled is satisfactory for this furnace structure, and the carbides may be made at a high temperature within the central zone of the furnace while the outer wall is held at a comparatively low temperature. Thus, the charge itself serves as a protection for the inner cooled wall of iron and neither the boron oxide nor any reaction product will attack this wall, nor will the wall material react with the charge to detrimentally affect the properties of the desired abrasive metal compound.

It is also desirable to build the furnace so as to take care of its electrical requirements. The metal carbide is a conductor of electricity at the high temperature employed. Hence, the metal walls ought to be far enough away so that they will not contact with this hot material. Also at the start of the furnace run, the resistance of the furnace is high and under the required high voltage impressed upon the resistor, there is considerable danger of leakage from the end walls 12 to the shell 10 and a serious loss of power. It is necessary that this alternate parallel circuit be broken at a point which is outside of the high temperature zone where the charge is not conductive and where the resistance of the charge is so high that the electrical leakage is small. Hence, the asbestos ring 16 is located outside of the high temperature zone, and particularly since the asbestos would fuse and become conductive adjacent to the center of the furnace. Therefore, the insulation 16 is arranged to extend inwardly only through a sufficient distance to prevent a short circuit between the metal walls 10 and 12.

As a further insulation, the furnace is lined with an insulative material which keeps the charge from contacting directly with the metal walls. I have found that a suitable insulation for this purpose comprises ordinary wooden boards which carbonize during the run of the furnace but are not consumed and so remain in a protective capacity. The arrangement illustrated comprises a set of boards 58 arranged parallel with the resistor rod and lining the inner furnace wall 10 except adjacent to the screen, as shown in Fig. 2. Likewise, the end walls are covered by the boards 59. Other suitable insulating material may be used. For instance, in the manufacture of silicon carbide, one might use silica brick in place of the wood; but these silica bricks would not be available for use in the manufacture of boron carbide because the boron oxide of the charge would attack the silica at the temperature of the furnace. Titania is a refractory material in itself, and it is feasible to use the water cooled shell for the charge of titanium oxide and carbon and to line the furnace with either wood or titania bricks. Similar conditions apply to the manufacture of tungsten carbide. It is found that the insulation of wood is best adapted for making this material as well as the other abrasive metal carbides, since it does not introduce undesired impurities into the reactive material.

The furnace walls and the charge located adjacent thereto must be kept sufficiently cool so that their conductivity is low and the danger of current leakage is small. A primary feature of this invention lies in keeping the end walls 12 of the furnace cool. This is accomplished by pouring water into the trough 24 and thus cooling the wall 12 by conduction. If desired, a further water spray may be thrown directly upon the end walls at any suitable point. It is to be noticed, as shown in Fig. 2, that the top portion of the casing 10 is not wetted by the water spray, since it is thrown onto the casing at a point below the screen 54. This insures that the space 56 within the casing is held at a high enough temperature so that the volatile boron oxide fumes are condensed to a liquid but not solidified, and the material is sufficiently hot so that it will drip back into the charge as a liquid. Thus the condensed boron oxide goes back into the charge and cannot plug up the upper portion of the casing and prevent escape of the carbon monoxide gas.

If it is desired that the furnace have a low inductance, then the construction and electrical arrangement shown in Fig. 6 may be followed. Instead of connecting the electric terminals to the ends of the resistor rod 22, I may connect them indirectly, as illustrated, wherein the terminal 63 is connected to one of the flanges 14 of the peripheral casing wall 10 and the terminal 64 to the adjacent end wall 12. The flanges and the end walls are separated by the insulation 16 at both ends of the furnace, the construction of which is the same as described with reference to Figs. 1 and 2. In order that the electrical path may be completed, one or more connecting loops 65 of conductive metal are welded or otherwise fastened to the left hand flange 14 and to the adjacent end wall 12. By this arrangement, the current flow is from the terminal 63 through the outer iron casing 10, the left hand end wall 12, then through the resistor rod and sleeves 30 and back to the right hand end wall 12 and its terminal 64. It will be appreciated that aluminum may be used for the shell casing and magnetic effects thus avoided.

By this arrangement, the directions of the current flow in the resistor rod and in any section of the casing parallel thereto are opposite at any given instance so that the self induction of this circuit and power losses due to hysteresis and eddy currents in the shell 10 are thus brought to a minimum. It may also be observed that the resistance of the outer shell is very low; so that by thus providing a current path of low resistance as well as low impedance, I am able to utilize in this furnace a high percentage of the power input. Hence, in a construction in which a central resistance rod is arranged centrally or axially of the surrounding peripheral metal casing, it is desirable to use the outer casing as a part of the circuit and thus cut down the inductance to a harmless degree. For example, I may obtain a power factor of 97 or 98% with a 25 cycle alternating current and thus obtain the necessary high temperature for making boron carbide without employing a high voltage. This construction is particularly important in a furnace intended for the manufacture of an abrasive metal carbide in which a graphite resistor of high conductivity is employed and where the charge contains a large amount of conductive carbon and so requires that the furnace be operated at a low voltage to produce a high current flow, because of the danger of short circuiting through the charge from the metal end walls to the peripheral casing wall 10.

Various modifications of this furnace construction will be readily apparent. For example, any resistance furnace which has an outer peripheral shell of metal and a resistor located centrally or axially therein may be made noninductive by so connecting the terminals that the alternating current passes through the casing and the resistor in opposite directions at any instant. This does not require the metal end walls but merely suitable electrical connections for the purpose of providing the circuit, in which the casing terminal is at the same end of the furnace as is the other terminal, which is connected directly or indirectly to the resistor. A direct connection involves connecting the terminal 64 directly to the right hand end of the resistor by a suitable copper strap, which preferably connects to its bus bar close to that of the other terminal. It is desirable where a high amperage is involved that the terminals be arranged closely adjacent to each other as shown in Fig. 6. The preferred arrangement involves employing low resistance metal end walls and making them a part of the circuit by mounting the resistor on the walls in electrically conductive relation thereto. It is important to avoid loops of connecting wires and arrangements which add to the inductance.

The operation of this furnace will be apparent from the above disclosure. In order to load it, the furnace may be set up on one end and the other end wall 12 removed. Then with the screen 54, the wooden boards 58 and 59 and the resistor rod 22 in position, the charge may be suitably packed around the resistor. Thereafter the upper end wall 12 and asbestos ring 16 are bolted in place and the upper sleeve 30 assembled on the resistor and slid into position. The furnace when loaded is turned back to the horizontal position shown in Fig. 1. In the use of the furnace, it is ordinarily desirable to have the two end plugs 38 in place, as shown in Fig. 1, so as to avoid any circulation of air through these several exit passages. The flow of water over the parts to be cooled is regulated in accordance with the temperature conditions desired and the furnace will be operated in accordance with standard procedure, as is well understood by those skilled in this particular art.

When making boron carbide in this furnace, anhydrous boron oxide and granular carbon, such as is found in the form of petroleum coke of high purity, are mixed in a finely divided granular condition in the required proportions. It is preferable to employ about two molecular equivalents of the boron oxide to seven equivalents of carbon. If desired, sawdust in a small amount may be incorporated in the charge to insure a suitable porosity during the furnace run. Also kerosene may be added in order that the volatile oil may vaporize at a comparatively low temperature and drive the air out of the charge and thus prevent oxidation of the boron carbide. The current flow is regulated to insure a sufficient temperature of about 2400° C. for the synthesis. During the stage of passing the electrical current through the resistor, a gradually enlarging ingot of boron carbide is made, but this material cannot be oxidized because there is no air or oxygen present. When the ingot has become of sufficient size and the current flow has been broken, then for the cooling step, the plugs 38 are put in place and the admission of air to the material is prevented. The other carbides are made similarly from the oxides of the required metals mixed with granular carbon as is well understood. The main condition in each case is to prevent the admission of air to the heated charge and to control the escape of gases and volatile matter.

Although I have herein stated that the resistor rod is centrally located in the furnace, it will be understood that this is relatively so, as slight variations may be made in the position of the resistor rod without sacrifice of the advantages of a symmetrical location. Furthermore, there are certain advantages in a more than slight removal of the rod from the exact central position in certain cases. For example, I may locate the resistor rod substantially lower than the central axis in order to be able to locate a greater portion of the charge thereabove. Nevertheless, it will be seen that it is highly desirable to space the rod a substantial distance from the wall 10.

It will thus be seen that there has been provided by this invention an apparatus in which the various objects hereinabove set forth together with many thoroughly practical advantages are successfully achieved. As various possible embodiments may be made of the above invention, it is to be understood that all matter hereinbefore set forth or shown in the accompanying drawings is to be interpreted as illustrative and not in a limiting sense.

I claim:—

1. A resistance furnace for making an abrasive metal carbide by the electrical synthesis of a granular charge of an abrasive metal oxide and carbon comprising a metal peripheral wall and annular end walls forming a substantially closed casing for holding said charge, a resistor rod passing centrally through the charge in the casing and projecting outwardly through and supported by the end walls, water cooled electric terminals on the ends of the rod, insulation arranged to prevent the electric current from being short circuited through the casing, means forming a closable gas exit through the top of the casing which permits escape of generated gases and may be closed during the cooling stage to prevent the admission of air to the charge, and means including valved pipes for applying a variable stream of water to the peripheral and end walls of the casing and controlling the temperature of the outer zone of the charge.

2. A furnace of the type covered by claim 1 in which the casing has an insulative lining comprising wooden boards.

3. A resistance furnace for making an abrasive metal carbide by the electrical synthesis of a granular charge of an abrasive metal oxide and carbon comprising a cylindrical metal casing and annular metal end walls forming a substantially closed casing for holding said charge, a horizontal resistor rod passing centrally through the charge and said end walls, means for supporting the ends of the rod on said end walls and closing the openings therethrough, water cooled electric terminals connected to the ends of the rod, insulation between the charge and the metal walls, insulation arranged to prevent the electric current from being short circuited through the casing, a perforated wall spaced from the peripheral casing wall and forming a gas space at the top of the casing, a gas exit passage opening from said space, means for closing the passage and preventing the admission of air during the cooling stage, and means including pipes for applying a variable stream of water to each of the casing walls and controlling the temperature of the outer zone of the charge.

4. An electric resistance furnace for making an abrasive metal carbide from a charge of abrasive metal oxide and carbon comprising a substantially closed casing having a peripheral metal wall and two annular metal end walls arranged to carry a charge of granular material, each end wall having a projecting metal hub, a graphite sleeve mounted within and supported directly by each of said hubs, a graphite resistor rod extending substantially centrally through the furnace casing and the charge therein which projects through each of said sleeves and is slidably fitted therein, insulation between an end wall and the peripheral wall, a water cooled terminal on each end of the resistor rod located externally of said sleeve and hub, means for applying a stream of water to the casing and to said hubs and means providing a closable opening through a casing wall for the escape of gases within the furnace charge and preventing the admission of air thereto.

RAYMOND R. RIDGWAY.